US011465730B2

(12) United States Patent
Romec et al.

(10) Patent No.: US 11,465,730 B2
(45) Date of Patent: Oct. 11, 2022

(54) AIRCRAFT DOOR OPENING SYSTEM

(71) Applicant: LATECOERE, Toulouse Occitaine (FR)

(72) Inventors: Christian Romec, Cammas Occitaine (FR); Renaud Othomene, Toulouse Occitaine (FR)

(73) Assignee: LATECOERE, Toulouse (FR)

( * ) Notice: Subject to any disclaimer, the term of this patent is extended or adjusted under 35 U.S.C. 154(b) by 55 days.

(21) Appl. No.: 16/771,874

(22) PCT Filed: Dec. 13, 2018

(86) PCT No.: PCT/EP2018/084801
§ 371 (c)(1),
(2) Date: Jun. 11, 2020

(87) PCT Pub. No.: WO2019/121337
PCT Pub. Date: Jun. 27, 2019

(65) Prior Publication Data
US 2021/0179253 A1 Jun. 17, 2021

(30) Foreign Application Priority Data
Dec. 19, 2017 (FR) ...................................... 1762409

(51) Int. Cl.
B64C 1/14 (2006.01)
B64C 1/22 (2006.01)
E05D 7/00 (2006.01)

(52) U.S. Cl.
CPC ............ B64C 1/143 (2013.01); B64C 1/1461 (2013.01); B64C 1/22 (2013.01); E05D 7/009 (2013.01); E05Y 2900/502 (2013.01)

(58) Field of Classification Search
CPC ......... B64C 1/143; B64C 1/1461; B64C 1/22; B64C 1/1415; E05D 7/009; E05Y 2900/502
See application file for complete search history.

(56) References Cited

U.S. PATENT DOCUMENTS 4,510,714 A * 4/1985 Kasper .................. B64C 1/1415
244/129.5
4,720,065 A * 1/1988 Hamatani ............. B64C 1/1407
244/129.5

(Continued)

Primary Examiner — Assres H Woldemaryam
(74) Attorney, Agent, or Firm — Defillo & Associates, Inc; Evelyn A. Defillo

(57) ABSTRACT

The invention relates to an opening system (10) for an auxiliary door (20) of an airplane in a fuselage (30), the door and the fuselage having skins in the extension of one another. In one exemplary embodiment, the system (10) includes a framing lintel (11) integrated into the fuselage, an upper beam (2S) of the door structure arranged opposite the lintel (11), and a set of three lever links (4A, 4B, 4C). Each link is connected, on the one hand, to the lintel (11) by a lever articulation (5a, 6a) fixed relative to the fuselage (30) and, on the other hand, to the upper beam (2S) by a lever articulation (5b, 6b) mobile with the door (20), the articulations (5a, 5b; 6a, 6b) being connected respectively to the lintel (11) and to the upper beam (2S) by fittings (41, 43; 42, 44). The set of links includes two types of link mounted alternately, in which the mobile articulation (5b, 6b) remains positioned respectively close to the fuselage skin (30) and further from this skin (30), the articulations (5a, 5b; 6a, 6b) of two adjacent levers (4A, 4B; 4B, 4C) forming an evolving quadrilateral.

10 Claims, 4 Drawing Sheets

(56) References Cited

U.S. PATENT DOCUMENTS

| | | | | |
|---|---|---|---|---|
| 5,031,863 | A * | 7/1991 | Noble | B64C 1/143 |
| | | | | 244/129.5 |
| 5,064,147 | A * | 11/1991 | Noble | B64C 1/143 |
| | | | | 244/129.5 |
| 5,931,415 | A * | 8/1999 | Lingard | B64C 1/143 |
| | | | | 244/129.5 |
| 6,276,026 | B1 | 8/2001 | Wille | |
| 9,592,902 | B2 * | 3/2017 | Perkins | B64C 1/1461 |
| 9,783,311 | B2 * | 10/2017 | Bessettes | B64D 25/14 |
| 10,647,403 | B2 * | 5/2020 | Merkel | B64C 1/1461 |
| 2002/0096602 | A1 * | 7/2002 | Dazet | B64C 1/143 |
| | | | | 244/129.5 |
| 2007/0257151 | A1 | 11/2007 | Mindermann et al. | |
| 2010/0019089 | A1 * | 1/2010 | Sibley | B64C 1/1407 |
| | | | | 244/129.5 |
| 2015/0014483 | A1 * | 1/2015 | Minchau | B64C 1/1423 |
| | | | | 244/129.5 |
| 2016/0083071 | A1 | 3/2016 | Pichlmaier et al. | |
| 2017/0183079 | A1 | 6/2017 | Minchau | |

\* cited by examiner

AIRCRAFT DOOR OPENING SYSTEM

CROSS REFERENCE TO RELATED APPLICATION

This application is a national stage entry of PCT/EP2018/084801 filed Dec. 13, 2018, under the International Convention claiming priority over French Patent Application No. FR1762409 filed Dec. 19, 2017.

TECHNICAL FIELD

The invention relates to an opening system for an auxiliary door of an airplane, comprising a mechanism mounted on the fuselage of the airplane and consisting of articulated links forming articulated quadrilaterals between the door and the fuselage.

On current aircraft, the emergency doors located above the wing of the airplane, also called "overwing" doors, ensure, apart from their function of evacuating passengers in an emergency situation, access to the upper surface of the wing. Aircraft are also equipped with a cargo door by which freight can be loaded and unloaded. Such doors, opening outward from below upward are hereinafter referred to as "auxiliary doors", as opposed to the "passenger" doors for boarding and disembarking passengers of commercial airplanes, these being of significantly more complex design (dimensions, weight, integration of slides, massive horizontal articulation arm, etc.).

In general, the opening of an airplane door, for example a passenger or auxiliary door, can be broken down into several successive movements: unlocking and releasing a safety catch, lifting and pivoting of the door by actuators about an axis of rotation. For closing, these movements follow one another according to a reverse kinematic.

The auxiliary doors are equipped either with an arm that is articulated to the fuselage, the arm being linked to the door by a mechanism for releasing stops by translation, or by a hinge. In general, the hinges of the "overwing" type doors are of the articulated arm type and allow the stops to be disengaged. The rigid hinge of the "piano hinge" type, between the fuselage and the door, requires an independent mechanism responsible for releasing the fittings from the fuselage. Such a piano hinge is conventionally fitted to cargo doors.

PRIOR ART

Rigid aircraft door opening hinges are disclosed, for example, in patent documents U.S. Pat. No. 6,276,026, US2007257151, or US2016083071. In order to improve the tightness of the rigid hinges of an airplane door, it has been proposed to use a seal between the door and the fuselage of the airplane. Such a solution is for example described in US patent 20090095841. The piano hinge has the advantage of requiring little space but, on the other hand, requires an adaptable covering gasket if the hinges are not to be exposed to the flow of air.

However, the rigid connection between the fuselage and the door generates high-level interaction forces during deformations of the fuselage in flight. These forces pass into the door and alter its structure. In addition, the installation of a rigid hinge requires high precision both in connection with the fuselage and with the door. In addition, these rigid hinges have an external face mounted in a non-flush manner on the outer skin of the fuselage, which disturbs the aerodynamics of this zone during movement through the air.

Also known from patent document U.S. Pat. No. 5,031,863 is an airplane auxiliary hatch opening system in which two parallel hinge arms are pivotally mounted on the fuselage and on the hatch via upper and lower lifting levers. The hinge arms bring about an upwards and outwards pivoting movement of the hatch. This solution provides a rigid articulation and does not allow adaptability between the hatch and the fuselage when the hatch pivots.

Furthermore, US patent document 20170183079 discloses an aircraft door connection assembly on a fuselage section comprising a double main hinge connected to the fuselage section and a connection assembly between the door and the main hinge. This assembly incorporating an element connected to the door by sliding and pivoting. Such an assembly makes it possible to move the door upwards and inwards by pivoting about a virtual pivot point. However, such an assembly with two identical side hinges has the same limits as that of document U.S. Pat. No. 5,031,863, cited previously.

SUMMARY OF THE INVENTION

The invention aims to eliminate these drawbacks using a door hinge comprising a set of articulated lever links forming between them geometric configurations with evolving quadrilaterals during the door opening kinematic. These configurations allow the door to "float" relative to the fuselage, where floating means that the hinge can adapt instantaneously, without giving rise to any stress, by virtue of the establishment of flexible links operated by the combination of levers. Such an ability to float thus eliminates the interaction forces of rigid hinges, while making it possible to simplify the installation thereof. In addition, all the links being integrated into the fuselage, the aerodynamics of the aircraft are no longer disturbed.

In that regard, the present invention relates to an opening system for an auxiliary door of an airplane in a fuselage, the door and the fuselage having skins in the extension of one another. This system comprises a lintel for framing the auxiliary door, integrated into the fuselage, and an upper beam of the door structure arranged opposite the lintel. In addition, this system comprises a set of at least three lever links extending transversely with respect to the door skin and fuselage skin to form a coupling of the door to the lintel. Each link is connected, on the one hand, to said lintel by a lever articulation fixed relative to the fuselage and, on the other hand, to said upper beam by a lever articulation pivotally mobile with the door during opening thereof, the articulations being formed at the ends of the levers and connected respectively to the lintel and to the upper beam by fixing means. The set of links comprises a first and a second type of link mounted alternately. In two successive types of link, the pivotally mobile articulations and the fixed articulations are positioned head to tail, so that the mobile and fixed articulations of two adjacent levers form an evolving quadrilateral which controls the kinematics of opening of the door while maintaining flexibility of articulation between the lintel and the upper beam.

Under these conditions, the mechanism with levers articulated according to articulated quadrilaterals allows a certain float and adaptability between the fuselage and the door, which eliminates the interaction forces of the fuselage on the door. In addition, this mechanism makes it possible to significantly reduce the number of parts for the functions of positioning the door in its frame when it is closed, of increasing the resistance to internal pressure during the flight phase, of facilitating control of the kinematics of the door during opening, and of keeping the door in the open position.

According to preferred embodiments:

the upper door structure beam having an upper face perpendicular to the door skin, a fitting as a fixing means connecting the articulations of the levers of the first type of link to said upper beam comprises a fixing base extending on the upper face of said beam;

the lintel having a lower face perpendicular to the fuselage skin and a front face parallel to the fuselage skin, a fitting as a fixing means connecting the articulations of the levers of the first type of link to the lintel has a fixing face that is square partly on the lower face and partly on the front face of the lintel;

the upper door structure beam having a front face parallel to the door skin and perpendicular to the upper face of said beam, a fitting as a fixing means connecting the articulations of the second type of link to the upper beam of the door structure is partly fixed on the upper face and partly on the front face of said upper beam;

a fitting as fixing means which connects the articulations of the second type of link to the lintel has a fixing base extending on the underside of the lintel;

the set of links comprises three levers, two levers of the first type of link surrounding a central lever of the second type;

an insulation panel extends from an end zone of the fuselage skin and in front of this zone, this panel pressing against a door seal when the door is in the closed position;

a mass compensation system, comprising for example at least one jack, of the hydromechanical or other type, is arranged in the extension of at least one of the levers, in particular of the central lever of the second type in the case of a three-lever link set;

the fittings fixed on the upper door beam and connected to the articulations of the levers of the first type of link are in the form of goosenecks, while the levers of the second type of link have a lateral profile of curved shape facing the upper door beam, in order to properly move around the end zone of the fuselage when the door is pivoted to its maximum opening position;

a stiffening bar connects, parallel to the lintel, the articulations of the levers of the first type furthest from the skin of the fuselage.

In the present text, the qualifiers "upper" and "lower" refer to standard relative locations of elements, when the airplane is on the ground. The qualifier "longitudinal" refers to the direction of the main extension of an element. "Front" and "rear" refer to locations respectively on the side furthest from the skin of the fuselage, that is to say inside a passenger cabin of the airplane, and on the side closest to the internal skin of the fuselage, therefore close to the internal wall of this cabin. "Transverse" relates to an extent in a plane perpendicular to the longitudinal direction of the fuselage and "lateral" an extent seen in a transverse plane. Moreover, the qualifiers "external" and "internal" relate to locations outside and inside the airplane.

DRAWINGS

Other details, features and advantages of the present invention will emerge from reading the following non-limited description with reference to the appended figures in which, respectively:

DETAILED DESCRIPTION

In the figures, identical reference signs refer to the same element as well as to the corresponding passages of the description.

Figure 1A:
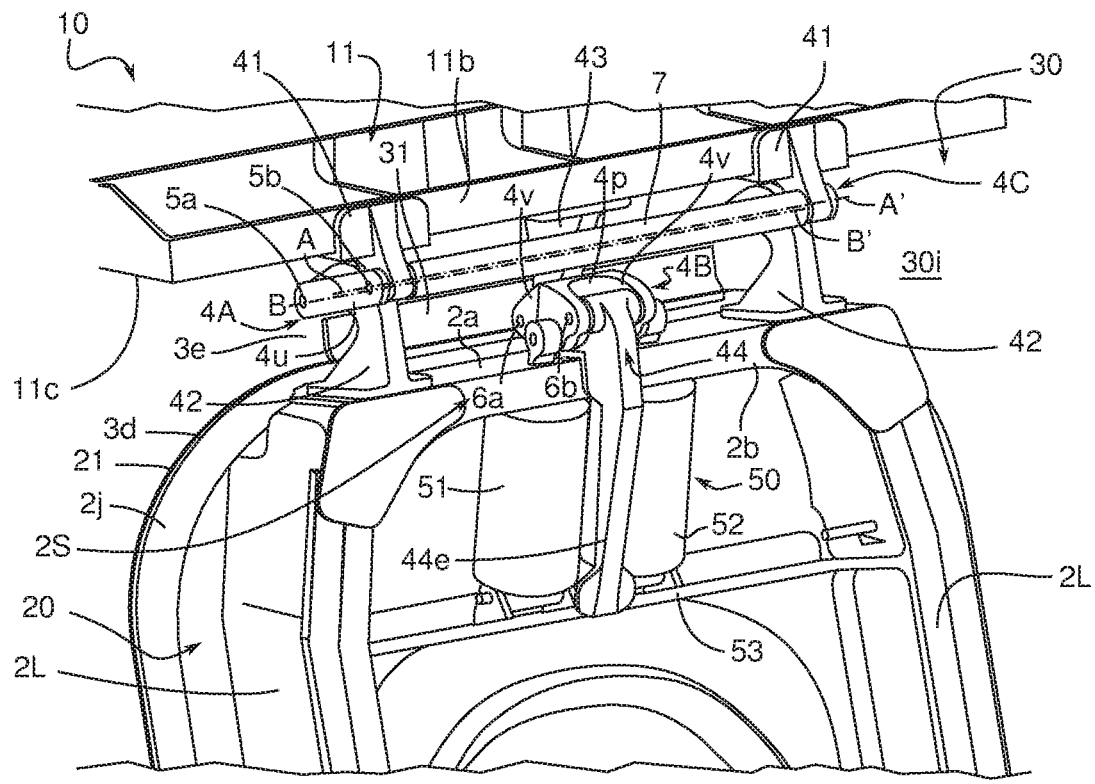
FIG. 1a shows a front perspective view of an example of an auxiliary airplane door opening system according to the invention provided with a three-lever mechanism, the door being in the closed position.
Figure 1B:
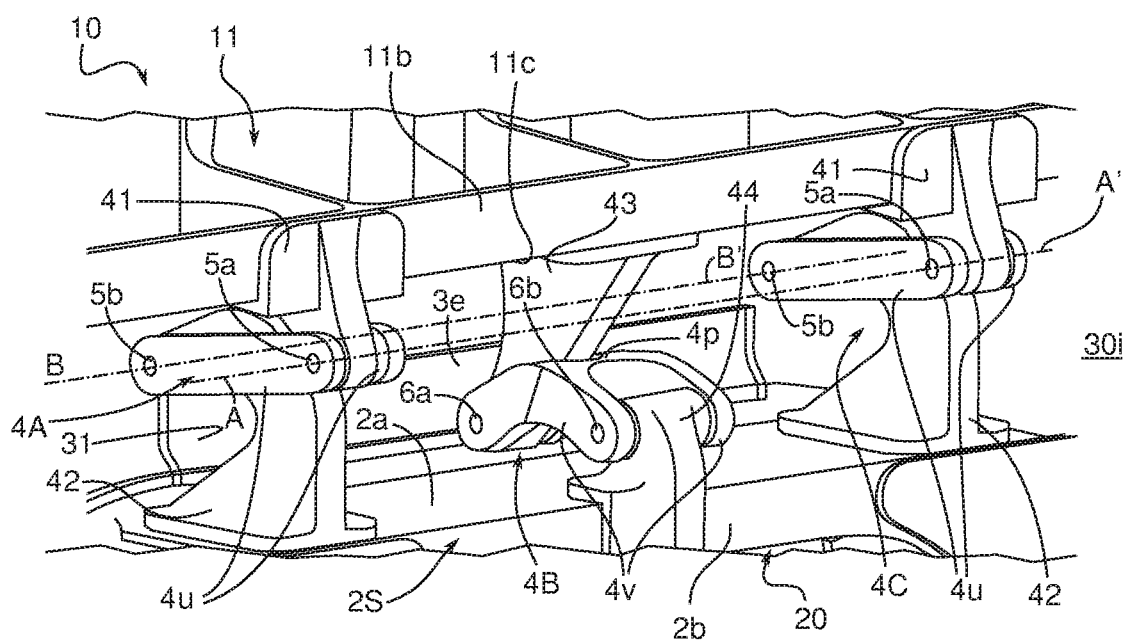
FIG. 1b show a detailed perspective view of an example of an auxiliary airplane door opening system according to the invention provided with a three-lever mechanism, the door being in the closed position.

The overall and respectively more detailed perspective views of FIGS. 1a and 1b illustrate, inside an airplane passenger cabin, an example according to the invention of an auxiliary door opening system 10 provided with a door skin 20 integrated into a 3d cutout of the fuselage skin 30. For reasons of simplification and legibility of the figures, the door and the fuselage are not shown in volume and can be assimilated, for understanding, to their skins 20 and 30.

The system 10 comprises a lintel 11 for the upper frame of the door skin 20. This lintel 11 is integrated into the fuselage by its rear longitudinal face 11a being fixed to the internal face 30i of the fuselage skin 30 by any known means (welding, adhesive bonding, melting, crimping, cofiring, etc.). The opening system 10 couples the door skin 20 to the lintel 11.

Said door skin 20 has an internal framing structure consisting of an upper beam 2S, arranged opposite the lintel 11, two lateral beams 2L and a lower beam (not shown) parallel to the upper beam 2S. The door skin 20 is held in the closed position by immobilization means conventionally affixed to the lower beam.

In this example, the coupling mechanism 40 consists of a set of three lever links 4A, 4B and 4C between the lintel 11 and the upper beam 2S extending transversely, that is to say substantially parallel to the side beams 2L as well as perpendicular to the door skin 20 and fuselage skin 30. The lever links 4A and 4C, which surround the central lever link 4B, are identical and are said to be of the first type. They are connected to the lintel 11 by fixing identical fittings 41 extending, at right angles, on its front longitudinal face 11b parallel to its rear face 11*a*, and on its lower longitudinal face 11*c* perpendicular to the front 11*b* and rear 11*a* faces. In addition, the levers 4A and 4C are connected to the upper beam 2S of the door skin 20 by other identical fittings 42, as a "gooseneck" in the example shown, fixed to the upper face 2*a* of the upper beam 2S.

Each lever 4A or 4C of the links of the first type has in this example two parallel, rectilinear and identical fins 4*u* which, at their opposite ends, form two articulations: an articulation 5*a* in axial rotation with one end of the fitting 41 which engages between the two fins 4*u*, and an articulation 5*b* in axial rotation with one end of the fitting 42 which also comes into engagement between the two fins 4*u*. The end articulations 5*a* connect the levers 4A and 4C to the lintel 11 in a fixed manner, while the end articulations 5*b* connect the levers 4A and 4C to the upper beam 2S in a mobile manner, in pivoting with the door skin 20.

In addition, the articulations 5*a* and 5*b* are aligned respectively on a fixed axis of rotation A'A and a movable axis of rotation B'B, parallel to the door skin 20 and the fuselage skin 30. The movable axis of rotation B'B, and therefore the articulations 5*b*, remain close to the internal face 30*i* of the fuselage skin 30 while the fixed axis of rotation A'A, and therefore the articulations 5*a*, remain more distant and at constant distance from this internal face 30*i*.

In the central lever link 4B, this lever 4B is connected to the lintel 11 by a fitting 43 fixed on the lower face 11*c* of the lintel 11 and to the upper beam 2S by a fitting 44 extending, at right angles, on the upper face 2*a* and on the front face 2*b* of the upper beam 2S.

In addition, the central lever 4B here has two fins 4*v* of generally curved lateral profile, facing the upper door beam 2S, and connected by a central bridge 4*p* giving an "H" shape to this central lever 4B. At the ends of these fins 4*v*, two articulations are also formed: an articulation 6*a* in axial rotation with one end of the fitting 43 which extends between the two ends of fins 4*v*, and an articulation 6*b* in axial rotation with one end of the fitting 44 which also extends between the two fins 4*v*. Thus, the end articulation 6*a* connects the central lever 4B to the lintel 11 fixedly via the fitting 43, while the end articulation 6*b* connects this central lever 4B in a pivoting manner to the door skin 20 via the fitting 44.

Thus, it appears that each pair of adjacent levers, the levers 4A and 4B on the one hand and the levers 4B and 4C on the other hand, has articulations 5*a*, 5*b*, 6*a* and 6*b* forming a quadrilateral with two opposite articulations 5*a* and 6*a* that are fixed relative to the lintel 11 (and therefore to the fuselage 30), to which they are connected by the fittings 41 and 43, and with two opposite articulations 5*b* and 6*b* pivotally mobile with the upper beam 2S (and therefore with the door), to which they are connected by fittings 42 and 44.

Furthermore, the internal face of the fuselage 30*i* advantageously has an insulation panel 31 extending from a skin end region 3*e* of the fuselage 30, being offset in front of the 3*d* fuselage cut-out and up to coming to press on a door seal 2*j* which runs along the periphery 21 of the door skin 20.

Moreover, a mass compensation system 50, which is used during the door opening and comprises in this example two jacks 51 and 52, is advantageously mounted in the extension of the central lever 4B. This assembly is created between the upper beam 2S and a support arm 53 fixed parallel to the upper beam 2S, between the lateral beams 2L. The central lever 4B having a greater amplitude of angular movement than the others with respect to the door skin 20, the compensation system 50 then has a shorter travel, which makes it possible to reduce the travel of the mass compensation. It also appears that the fitting 44 is extended by a longitudinal extension 44*e* which is fixed at the end to the support arm 53.

Advantageously, a cylindrical stiffening bar 7 (which is not shown in FIG. 1*b* for reasons of visibility) connects, parallel to the upper beam 2S, the articulations 5*a* of the levers 4A and 4C of the first type of link most distant from the internal fuselage face 30*i*. The geometric axis of this bar 7 coincides with the fixed rotation axis A'A of the articulations 5*a*. Such stiffening ensures uniform operation of the levers 4A to 4C.

Figures 2A, 2B:
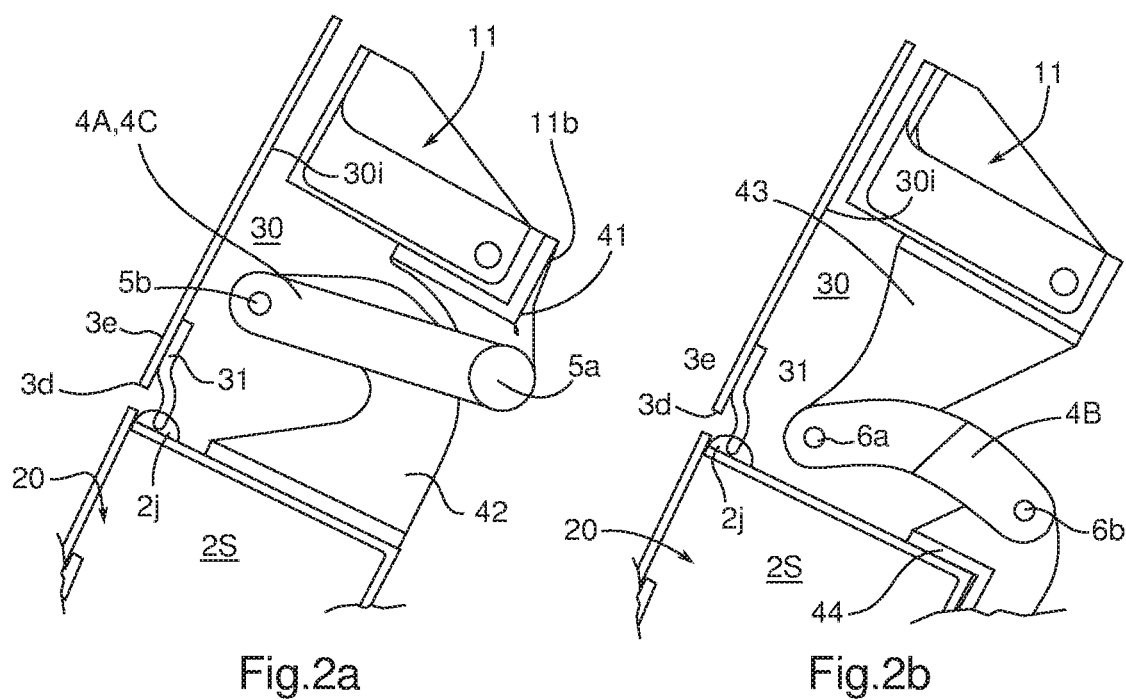
FIG. 2a shows a first side view of the three-lever door mechanism of FIG. 1 facing a lever of the first type and facing the central lever of the second type, the door being in the closed position.
FIG. 2b shows a second side views of the three-lever door mechanism of FIG. 1 facing a lever of the first type and facing the central lever of the second type, the door being in the closed position.

The side views of FIGS. 2*a* and 2*b* respectively illustrate, from another angle, the position of the lever links of the first type, 4A or 4C, and the position of the lever link of the second type 4B, when the door is in the closed position, in the 3*d* cutout of the fuselage skin 30. In these figures, the connection between the insulation panel 31 and the skin end zone 3*e* of the fuselage 30 appears in greater detail, as does the pressing of this panel 31 on the seal 2*j* of the door.

The side view of FIG. 2*a* shows that the fixed articulations 5*a*, linked directly to the lintel 11 via the fitting 41, are positioned at the level of the front face 11*b* of the lintel 11, and therefore more distant than the articulations 5*b* which are located near the fuselage internal face 30*i*. And these articulations 5*b*, linked to the upper beam 2S by the gooseneck fittings 42, will be able to be made to pivot about the articulations 5*a* when the door is opened.

The side view of FIG. 2*b* also shows that the end articulation 6*a* of the central lever 4B is fixedly connected to the lintel 11 via the fitting 43, and that the end articulation 6*b* of this central lever 4B, connected to the upper beam 2S via the fitting 44, will be able to make the lever 4B pivot with the door skin 20 about the other end 6*a*.

Figure 3A:
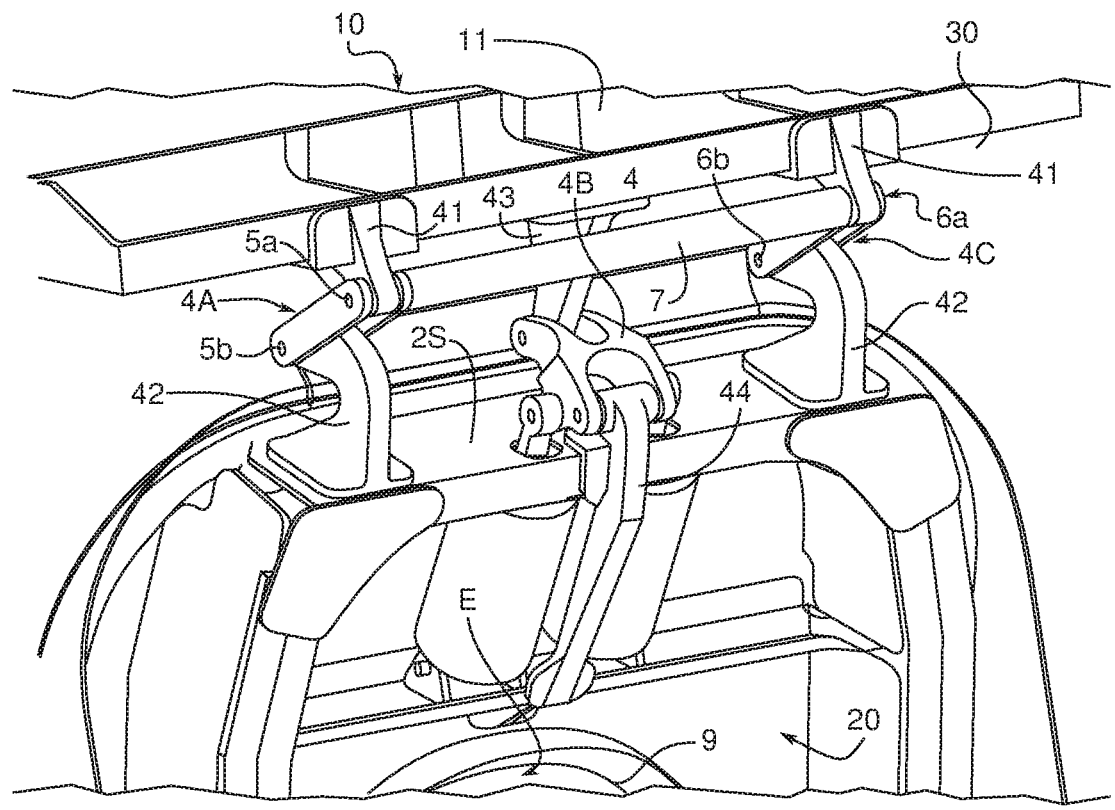
FIG. 3a shows a perspective view of the example system of FIG. 1 during the door opening kinematics, in a first intermediate door opening position.
Figure 3B:
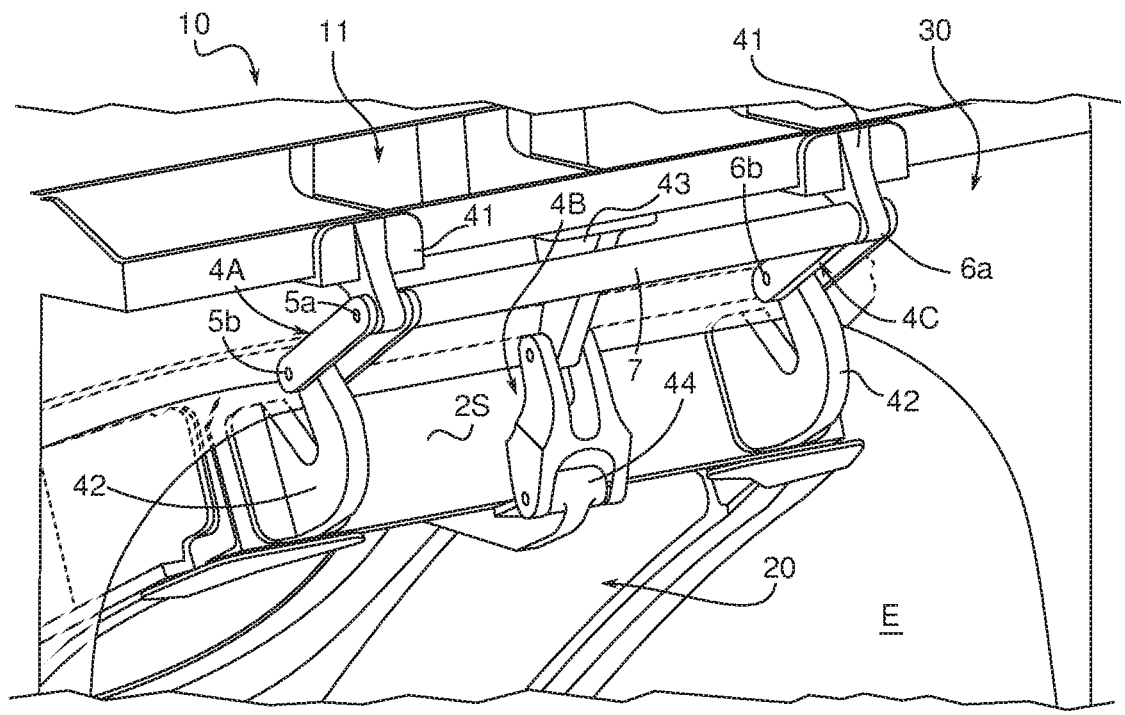
FIG. 3b shows a perspective view of the example system of FIG. 1 during the door opening kinematics in a second intermediate door opening positions.
Figure 3C:
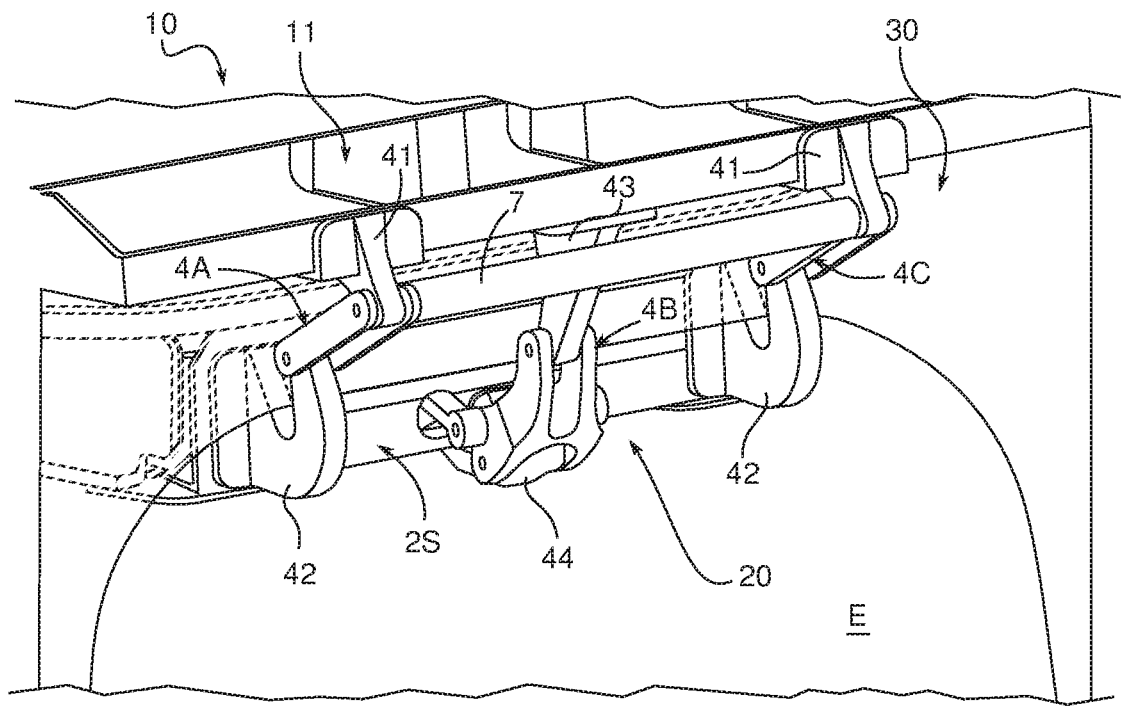
FIG. 3c shows a perspective views of the example system of FIG. 1 during the door opening kinematics in the maximum opening position of the door.

The opening kinematics of the door skin 20 by the system 10 are illustrated by the perspective views of FIGS. 3*a* to 3*c*, the door skin 20 being seen partially in transparency through the fuselage skin 30. Before opening, the door is held in the closed position by immobilization means affixed to the lower beam of the door structure (not visible), in particular a rigid holding mechanism of the "C-latch" lock type ("C" as in cylindrical) with unlocking controlled by the opening handle. The lever links 4A to 4C open the door by pivoting about the lintel 11.

FIGS. 3*a* and 3*b* show that, once released from the immobilization means (not shown in the figures), the door skin 20 pivots out of the airplane, to the outside "E" of the fuselage skin 30—shown through the window 9—about the fixed articulations 5*a* and 6*a* of the levers 4A to 4C connected to the lintel 11 via the fittings 41 and 43, as well as about the bar 7 which connects the articulations 5*a* of the levers of the first type of link 4A and 4C.

The other articulations 5*b* and 6*b* of the levers 4A to 4C, connected to the upper door beam 2S via the fittings 42 and 44, then pivot with the door skin 20. The quadrilaterals whose vertices are the articulations 5*a*, 5*b*, 6*a* and 6*b* are deformed with the variable position of the opposite articulations 5*b* and 6*b*, while the position of the other opposite articulations 5*a* and 6*a* is fixed. The position of the articulations 5*a*, 5*b*, 6*a* and 6*b* thus control the kinematics of opening the door, while allowing a certain "float" or flexibility of adaptation to the links between the upper beam 2S and the lintel 11.

In FIG. 3*c*, the door skin 20 reaches its maximum opening position. This position is maintained by known locking means—jaws, hooks, stops—or by the pressure exerted by the jacks 51 and 52 (cf. FIG. 1a or 3a) which form the system for mass compensation during opening by applying suitable pressure.

Figure 4A:
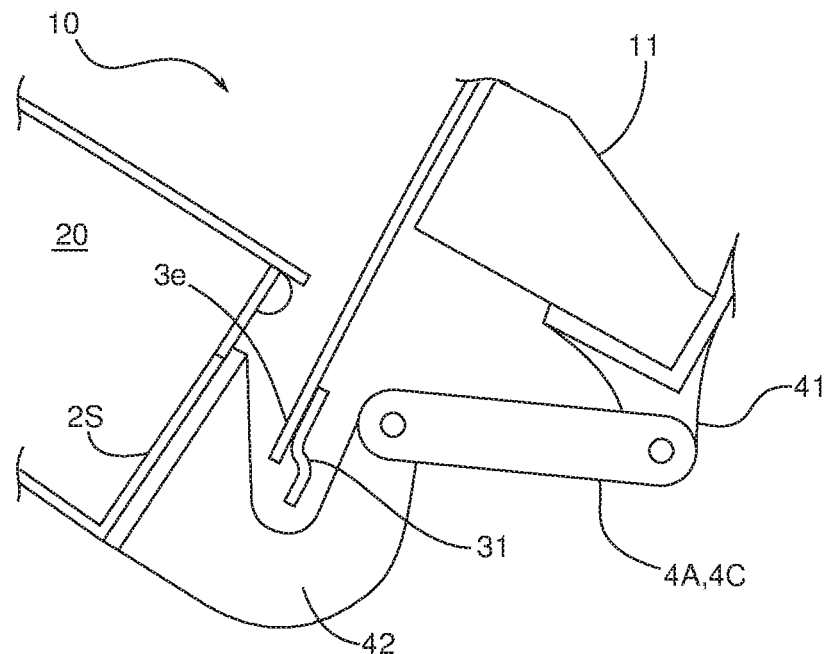
FIG. 4a shows a side view of the three-lever door mechanism of FIG. 1, facing a lever of the first type, the door being in the maximum opening position.
Figure 4B:
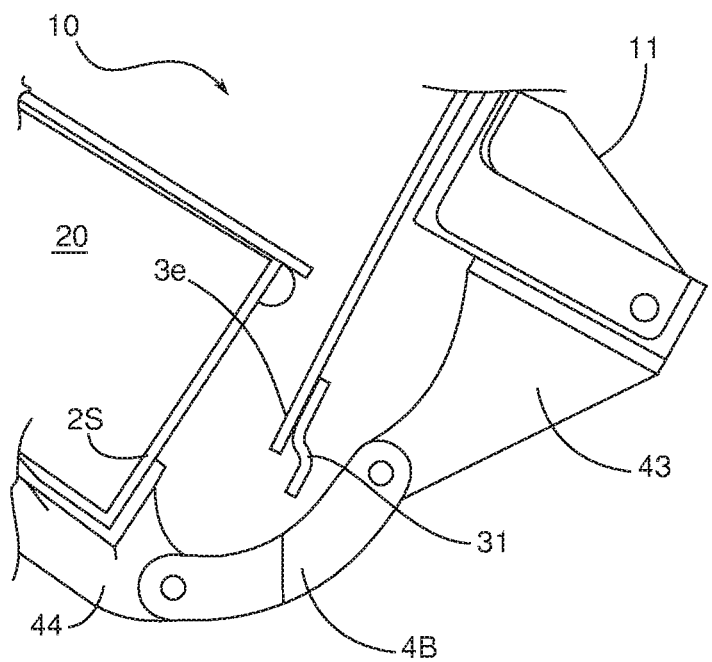
FIG. 4b shows a side views of the three-lever door mechanism of FIG. 1, facing the central lever of the second type, the door being in the maximum opening position.

The lateral views of FIGS. 4a and 4b also illustrate, respectively at the level of the lever links of the first type, 4A or 4C, and at the level of the central lever link of the second type 4B, the configuration of the opening system 10 when the door skin 20 is in the maximum opening position.

In particular, in these lateral views, it appears that the shape of the fittings 42 (FIG. 4a) and of the lever 4B (FIG. 4b) makes it possible to move precisely, and closely, around the projection formed by the skin end region 3e of the fuselage 30 and extended by the insulation panel 31 which extends from this region. In the case of the levers of the first type of link 4A and 4C between the fittings 41 and 42, fixed on the lintel 11 and the upper door beam 2S, this movement around is advantageously achieved by the gooseneck shape of the fittings 42 (FIG. 4a); in the case of the lever of the second type of link 4B (FIG. 4b), this movement around is achieved by the curved profile shape of this lever 4B between the fittings 43 and 44, fixed on the lintel 11 and the upper door beam 2S.

The invention is not limited to the embodiments described and shown. Thus, the mass compensation system may include one or more than two jacks which can be installed as an extension of the central lever or other levers.

The upper face of the upper door structure beam may be not perpendicular to the door skin. Similarly, the front face of the upper beam or the lintel may be not parallel to the door skin or fuselage skin. Other types of fittings and other fixing methods can be provided, including integration into the door threshold. In this case, the fittings are modified so that the axis of rotation AA' remains parallel to the axis of the desired hinge (generally according to the cutout of the panel), and that the articulations of the first and second type of link move in parallel planes.

Furthermore, the system for immobilizing the door in the open position is installed on a lever of the first type of link, on the fuselage side or on the door side, or on a lever of the second type of link, in particular on the central lever of the second type of link in the case of a three-lever link set, wherein this immobilizing system can then be mounted either by means of the compensation system or between the lever and the fuselage.

In addition, the profile of the fittings and levers is adapted to allow movement around the fuselage during the opening of the door and can adopt, in addition to the shapes described above, any suitable curved or concave shape.

In addition, the links of the two types can be centered on a link of the first or of the second type.

The invention claimed is:

1. An Aircraft comprising:
a door opening system; and
a fuselage having a fuselage skin;
   the door opening system comprises:
   an auxiliary door having a door skin,
the door skin integrated into the fuselage skin;
a lintel integrated into the fuselage skin;
an upper beam located on the door skin and arranged opposite the lintel; and
a set of lever links including a first lever link, a second lever link, and a third lever link extending transversely with respect to the door skin and fuselage skin to form a coupling of the door skin to the lintel,
wherein each lever link is connected, on a first side to said lintel by a fixed articulation fixed relative to the fuselage skin and on a second side to said upper beam by a mobile articulation pivotally mobile with the door skin when open, the fixed and the mobile articulations being formed at the end of the set of lever links and connected respectively to the lintel and to the upper beam by a fixing device, and the first lever link and the second lever link are mounted successive and alternately and the fixed articulation are positioned head to tail, so that the mobile and the fixed articulations of two adjacent first and second lever links form an evolving quadrilateral which controls the kinematics of opening the door skin, maintaining flexibility of articulation between the lintel and the upper beam.

2. The aircraft as claimed in claim 1, wherein the upper beam has an upper face perpendicular to the door skin, the fitting connecting the mobile articulation of the first and third lever links to said upper beam and a fixing base extending on the upper face of said upper beam.

3. The aircraft as claimed in claim 1, wherein the lintel has a lower face perpendicular to the fuselage skin and a front face parallel to the fuselage skin, a fitting connecting the articulations of the first and the second lever links to the lintel and a fixing face that is square on the lower face and on the front face of the lintel.

4. The aircraft as claimed in claim 2, wherein the upper beam has a front face parallel to the door skin and perpendicular to the upper face of said upper beam, a fitting connecting the articulation, of the second lever link to the upper beam and is fixed on the upper face and on the front face of said upper beam.

5. The aircraft as claimed in claim 3, wherein the fitting connecting the articulation, of the second lever link to the lintel a has a fixing base extending on the lower face of the lintel.

6. The aircraft as claimed in claim 1, wherein an insulation panel extends from an end region of the fuselage skin and in front of a zone, the panel pressing against a door seal when the door skin is in a closed position.

7. The aircraft in claim 1, wherein a mass compensation system is installed in the door skin in extension of the second lever link.

8. The aircraft as claimed in claim 7, wherein the compensation system comprises at least one jack arranged as an extension of at least one of the first and second lever links.

9. The aircraft as claimed in claim 1, wherein the fixing device is fixed on the upper beam and connected to the articulations of the first and the third lever links and the fitting; have a form of a gooseneck, wherein the second lever link has a lateral profile with a curved shape facing the upper beam.

10. The aircraft as claimed in claim 1, wherein a stiffening bar connects, parallel to the lintel, the articulations of the first and the third lever links from the fuselage skin.

* * * * *